Aug. 17, 1965
R. J. RASMUSSEN
3,200,916
READY BREAK LOOSE ANTI-FEEDBACK DEVICE
Filed June 24, 1963
3 Sheets-Sheet 1
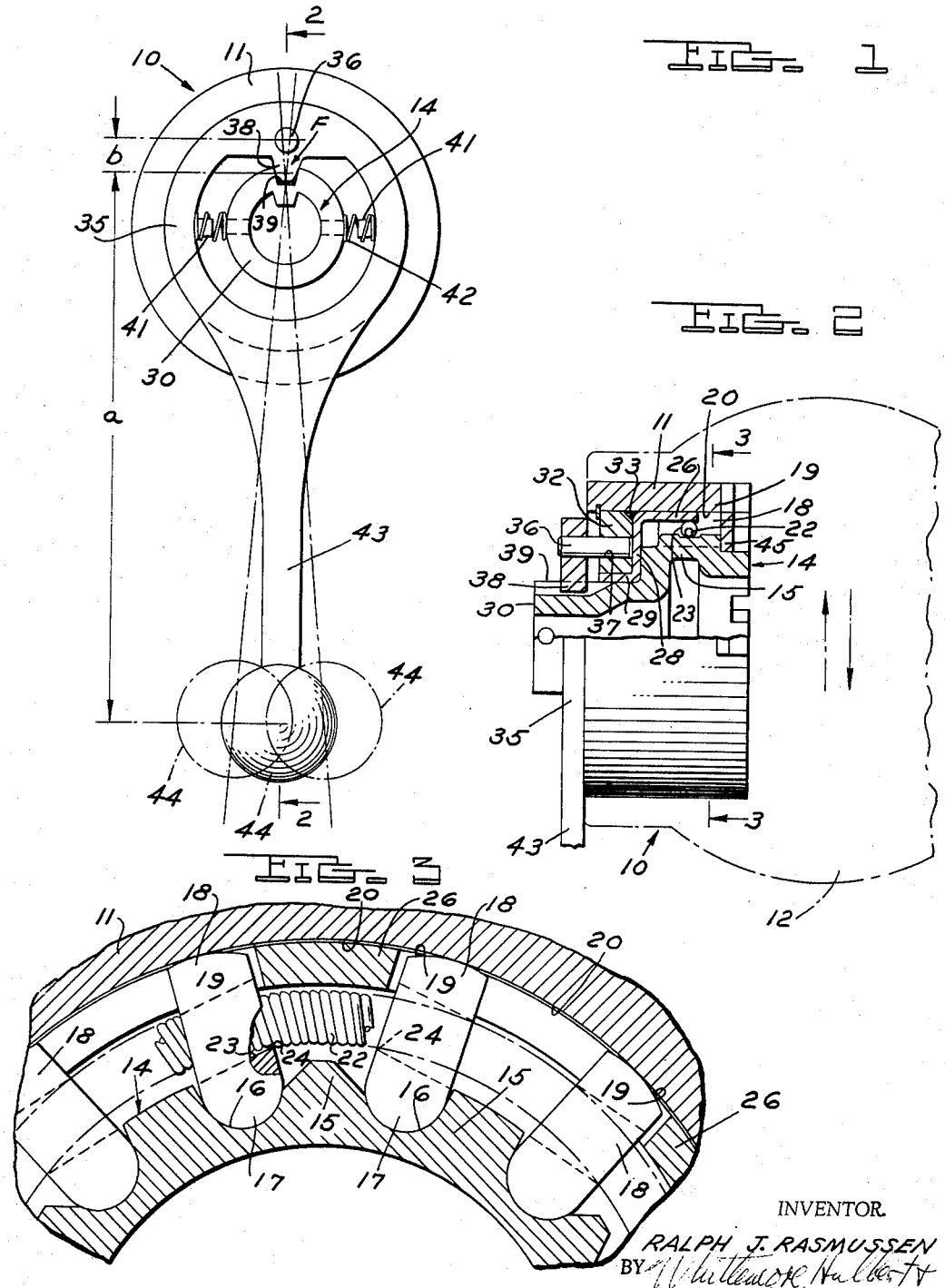
INVENTOR.
RALPH J. RASMUSSEN
BY
ATTORNEYS Aug. 17, 1965  R. J. RASMUSSEN  3,200,916
READY BREAK LOOSE ANTI-FEEDBACK DEVICE
Filed June 24, 1963  3 Sheets-Sheet 2

INVENTOR.
RALPH J. RASMUSSEN
BY Whittemore, Hulbert &
Belknap
ATTORNEYS

United States Patent Office 3,200,916
Patented Aug. 17, 1965

3,200,916
READY BREAK LOOSE ANTI-FEEDBACK
DEVICE
Ralph J. Rasmussen, New Baltimore, Mich., assignor to Formsprag Company, Warren, Mich., a corporation of Michigan
Filed June 24, 1963, Ser. No. 289,952
6 Claims. (Cl. 192—8)

The present invention relates to improvements in a ready break loose anti-feedback device of the general type illustrated and described in the copending application of Lund, Serial No. 139,783, filed September 21, 1961, now U.S. Letters Patent No. 3,119,479 of January 28, 1964, which itself pertains to improvements in a two-directional torque coupling and clutch mechanism which is the subject matter of a copending application of Lund, Serial No. 84,386, filed January 23, 1961, now U.S. Letters Patent No. 3,102,618 of September 3, 1963.

Devices of this type are capable of transmitting torque in both rotative directions, whether for a relatively minor angular displacement sufficient merely to loosen certain locking elements, such as sprags disposed in oppositely facing sets or pairs, and thereby permit an adjustment of one member relative to a fixed locking member, or for a continuing rotation in the manner of a driver in one rotative direction or the other. In either application, arrangements are such as to positively prevent a feedback of torque from an adjusted or driven member, respectively to an adjusting or driving member.

It sometimes happens that when placed in an adjustment locking position or in an anti-feedback driving position the displaceable clutch elements or sprags become relatively tightly wedged against the fixed locking surface; and the improvements of the above identified Lund Patent No. 3,119,479, as well as those of the present application, concern improved means acting through a mechanical advantage connection to facilitate initial disengagement of the sprags from their wedged relation to the fixed locking member, so that the rotative adjustment or drive in one rotative direction or the other may smoothly ensue.

It is an object of the present invention to provide a ready break loose anti-feedback device for the above rotative adjustment or driving purposes which is extremely simple in character, not only in regard to its overall construction, but in particular to the specific means providing longer and shorter moment arms, respectively, between a point of initial application of an adjusting or driving force and a fulcrum point, and from that fulcrum point to a point of effective application of the force to break loose the sprags from a fixed locking member or race.

More specifically, it is an object of the invention to provide a simplified device as described, in which the longer and shorter moment arms are parts of a lever of the first class fulcrumed between the points of application of effort and force on the load in a novel manner contributing to the improved simplicity of the device. In accordance with the invention, this is done by providing a fulcruming tooth of involute or cycloidal shape on the fulcrumed member, this tooth having fulcruming engagement with another part of the device. In the case of a simple rotative adjusting device, the part on which the tooth has fulcruming engagement, for angular swing in either direction of only a very few degrees, is a fixed anchoring part, with sets of oppositely disposed or oriented sprags located between this part and a movable adjusted part. In the case of a bi-directional driving device, the fulcruming tooth has engagement with a rotative part, the sprags being located between this part and a fixed member or race; so that following initial displacement of the sprags in one direction or another from wedging engagement with the fixed locking member, under force applied from a rotative input or driving member with the benefit of the desired mechanical advantage, the sprag loosening or disengaging member may then take driving engagement with certain of the sprags of the set to drive the other rotative member as an output member.

In further accordance with the invention, one embodiment thereof, in either its simple adjusting version or its rotative driving version, may include a tooth-fulcrumed part directly and integrally connected with an input or operating member to shift a set of sprag-freeing elements or fingers under the desired simple mechanical advantage represented by the ratio of its longer fulcrum arm to its shorter fulcrum arm.

In another embodiment, the tooth-fulcruming action is combined with a second mechanical advantage connection between the fulcruming tooth part and the torque input part. This enables the attainment of an overall mechanical advantage which is the product of the advantages of the compounded moments. Again, the compounded version is applicable to either a simple bidirectional rotative adjusting device or to a bi-directional drive transmitting device, both having the bi-directional anti-feedback characteristic. Compounding of the mechanical advantages permits a substantial compacing of the structure, such as is particularly necessary in a driving device.

Generally speaking, the invention affords an improved anti-feedback device of greatly simplified and reduced cost of construction, since its elements may be constituted by stampings and screw machine parts readily assembled to one another.

The foregoing as well as other objects will become more apparent as this description proceeds, especially when considered in connection with the accompanying drawings illustrating the invention, wherein:

FIG. 1 is an end elevational view, as from the left-hand side of FIG. 2, showing a very simple adaptation of the principle of the invention to a device for rotatively adjusting a part in either annular direction and thereafter locking the same in its adjusted position;

FIG. 2 is a view, partly broken away, in upright radial section in the plane of the line 2—2 of FIG. 1;

FIG. 3 is a fragmentary, enlarged scale view in vertical section on line 3—3 of FIG. 2, showing the use of a simplified type of sprag structure to lock the adjusted member, for large scale production at minimum cost;

Figure 4:
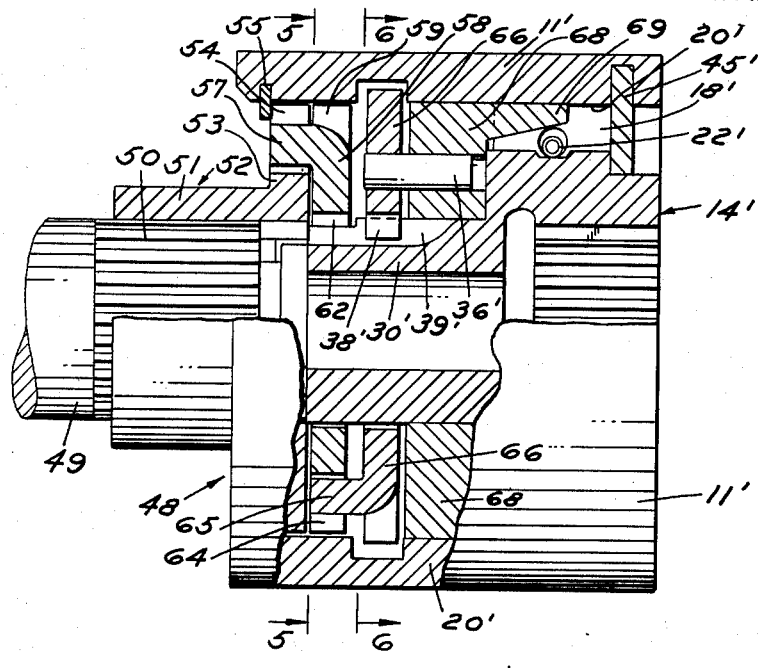
FIG. 4 is a fragmentary view of a compounded mechanical advantage device in accordance with a modified adaptation of the invention, being in radial section similar to FIG. 2.
Figures 5, 6:
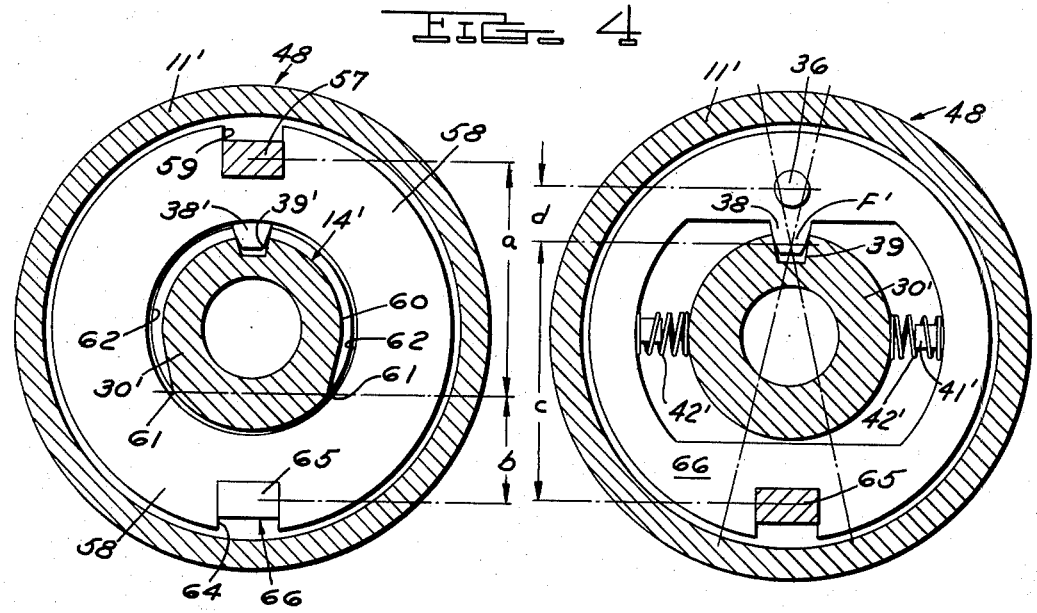
Figure 7:
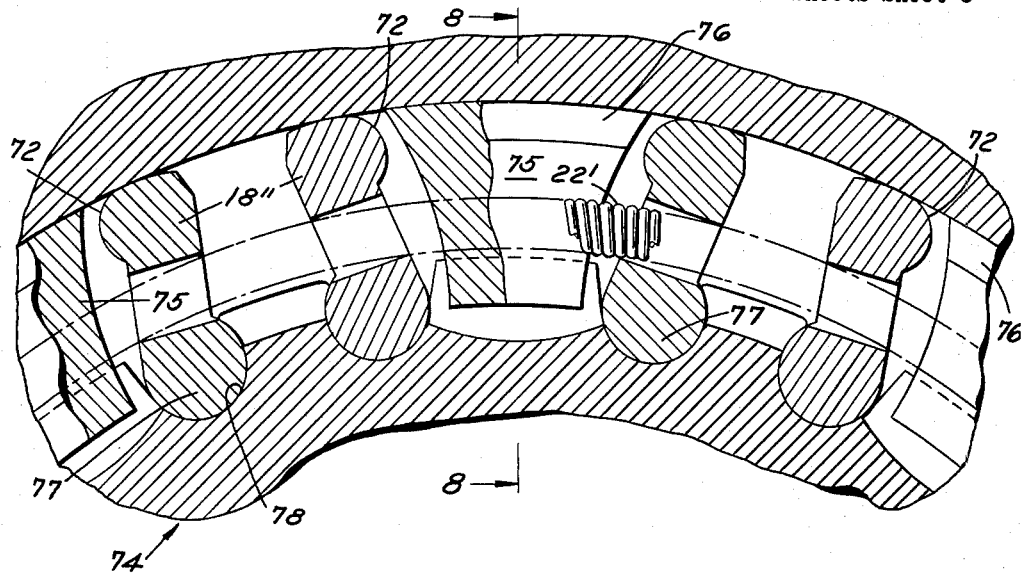
Figure 8:
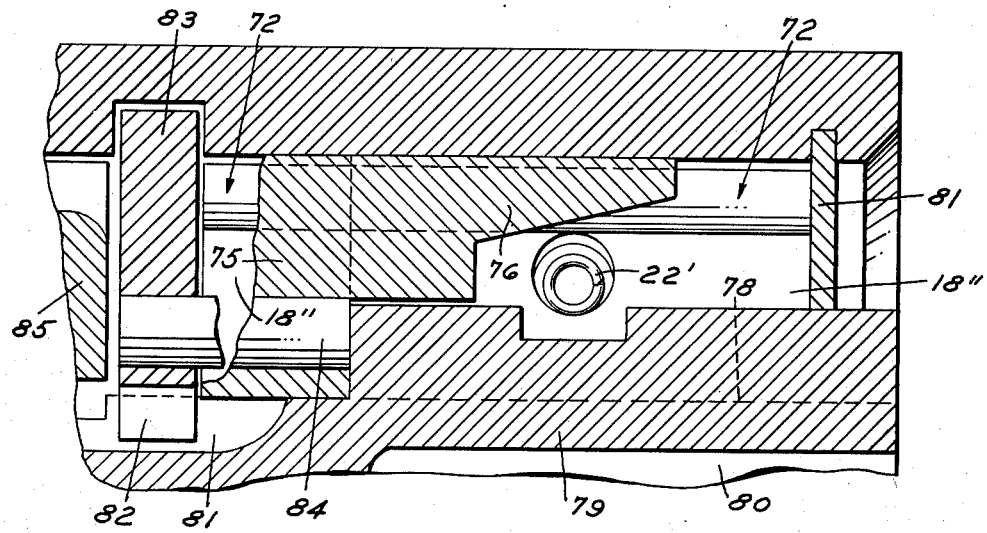

FIGS. 5 and 6 are, respectively, views in transverse vertical section on lines 5—5 and 6—6 of FIG. 4;

FIG. 7 is a fragmentary view in transverse vertical section generally similar to FIG. 3 of a further alternative modification of the principle of the invention in a two-directional anti-feedback driving clutch device, this view also illustrating sprags differing in geometry from those of FIG. 3; and FIG. 8 is a fragmentary view in section along line 8—8 of FIG. 7.

Referring first to FIGS. 1, 2 and 3 of the drawings, they show a very simple embodiment of the invention in a rotative adjustment device whereby one member may be rotatively adjusted a relatively few degrees in either angular direction relative to a fixed locking member, and then held against undesired retrograde movement in either direction under force directly applied to the adjusted member. Many applications of a device of this type will occur to those skilled in the art, for example, an adjustment of an articulated steering wheel enabling the convenient positioning of the hand wheel for the driver's ease in entering and departing the vehicle; an automobile seat adjustment; an adjustment of an automobile window ventilator panel; or any comparable adjustment in which but a few degrees of relative motion in one direction or the other are called for.

Considering the articulated steering wheel adjustment as being a typical adaptation of the device of FIGS. 1, 2 and 3, this device, generally designated 10, may comprise an annular locking member or cylindrical ring 11 internally mounted to an adjusted part such as a housing 12, shown in dot-dash line in FIG. 2, carried by the steering wheel proper (not shown); which housing it will be desired to adjust angularly relative to the steering column (not shown) in the opposite directions indicated by the dot-dash arrows in FIG. 2. This, as indicated above, is for the purpose of enabling the steering wheel to be shifted a few degrees up out of its normal steering position to permit easy access or exit of the driver. It will be appreciated that, in any locked position of the ring 11 and housing 12, the sprags of the device 10 may become so tightly wedged against the locking ring 11 as to make it desirable to force them loose by a relatively slight pressure exercised through the benefit of a mechanical advantage. As indicated above, it is a basic purpose of the device 10 to afford such advantage in freeing the ring 11 and structure mounted thereon from any locked position, for adjustment to a different position.

The reference numeral 14 designates a fixed locking member of tubular character, suitably anchored in any appropriate way to a steering column housing (not shown) or any other fixed support. The member 14 is formed to provide a radially outwardly offset annular portion 15 of enlarged diameter; and the portion 15 is, as illustrated in FIG. 3, formed to provide a plurality of sprag-receiving sockets 16 of the sort illustrated and described in the Lund patents identified above. The sockets 16 are arranged in spaced pairs, each to receive the generally semi-cylindrical radially inner portion 17 of a sprag 18, the rounded, radially outer wedging surface 19 of which is adapted for sliding or wedged locking engagement with a cylindrical inner race surface 20 of the adjustment locking annular member or ring 11.

As in the copending Lund patents, the sprags of the sucessive sets, of which there are typically eight constituted by sixteen sprags, are disposed with their wedging surfaces arranged oppositely of one another; and an annular coiled garter spring 22 extends through central holes 23 in the sprags, constrictively engaging edges 24 of these holes in a manner to urge the oppositely oriented sprags 18 of each pair or set into engagement with the cylindrical race surface 20 of ring 11. Thus, considering the centermost pair of sprags 18 appearing in FIG. 3, the spring 22 urges the left-hand thereof clockwise about a cylindrical seat in socket 16; while the rightmost is urged counterclockwise about its socket. The arrangement is the same as in the Lund patents identified above, although the geometry of the sprags 18 is different than shown in these applications.

The reference numeral 26 in FIG. 3 indicates a control finger for the releasing tilt, when rotated in one direction or the other, of one or the other of the last-mentioned sprags 18 from its wedged and locking engagement with the race surface 20. For the instant type of device involving eight pairs of sprags 18, there will be a control finger 26 located between each pair, the fingers being equally spaced circumferentially 45° from one another.

Referring again to FIG. 2, the fingers 26 are struck integrally from a centrally apertured, generally cup-like sheet metal stamping 28, a cylindrical reduced axially extending flange 29 of which is rotatably journaled upon a relatively small diameter body portion 30 of the fixed inner anchoring element 14. A reinforcing or stiffening ring 32 is spot-welded at 33 in encircling relation to the cylindrical flange 29 of stamping 28, these parts being rotatable a limited number of degrees, for example 3° or 4° in either angular direction from a neutral position, by the provisions to be described.

Thus, it will be seen that, as so rotated limitedly in one direction or another, the fingers 26 of the control member constituted by stamping 28 and rigid ring 32 will engage correspondingly oriented sprags 18 of the respective pairs, tilting the latter in their respective sockets 16 out of wedging engagement with the race 20. This frees the ring 11 on which said race is formed for its manual adjustment along with the part carrying the same in the indicated rotative direction relative to the fixed locking member 14. When the desired adjustment is had, the tilted sprags are allowed to resume spring-urged engagement with the race 20, thus holding ring 11 and associated parts against movement in either angular direction under rotative torque applied directly thereto.

Manual provisions for exercising the above control function include a fulcrum member 35 which, as shown in FIG. 1, is of annular nature, and fixedly carries a pin 36 extending parallel to its axis, this pin (as shown in FIG. 2) being fixedly received in an opening 37 of the reinforcing ring 32, hence capable of operating ring 32, stamping 28 and the control fingers 26 of the latter for a slight rotative motion on the body 30 of fixed locking member 14.

Radially inwardly of its pin 36, the fulcruming member 35 carries an inner radially inwardly extending fulcrum tooth 38 which is of an involute or cycloidal shape; and the tooth 38 has fulcruming engagement in an axially extending recess or seat 39 formed along the top of the body portion 30 of locking member 14, in the manner of a keyway. The fulcrum point is designated F.

The fulcrum member 35 is also provided with a pair of diametrically opposed stop pins 41 projecting from its inner annular surface, which pins serve as pilots for small coil compression springs 42 acting inwardly on the sides of the reduced size body portion 30 of anchoring element 14. They thus center the fulcruming member 35 relative to fixed member 14, pins 41 acting on stops limiting a sidewise floating action on the fulcruming member 35 when the latter is manipulated for the adjustment of ring 11 and housing 12. Such manipulation is performed through the agency of a handpiece 43 integral with member 35 (FIG. 1). This handpiece is adapted to swing between opposite limits of its axis indicated in dot-dash line, and is provided with a finger knob 44 at a distance "$a$" from the fulcrum F.

Thus, in operation, should the driver desire to adjust the steering wheel vertically in one direction or another as to facilitate ingress or egress to the driver's seat, he simply tilts the handpiece 43 in the proper direction. Upon the slight floating take-up involved in the moving of one of the stop pins 41 into engagement with the fixed body 30, the involute or cycloidal tooth 38 will rock in the body recess 39 in the manner of a fulcrum. This causes the pin 36 to move about its small moment arm "$b$" (FIG. 1) from fulcrum F with a corresponding shift by pin 36 of the ring 32 and fingers 26 secured thereon, i.e., circumferentially about the pilot bearing afforded by the reduced diameter body 30. Accordingly, one set or other of the correspondingly oriented sprags 18 will be tilted in its socket 16 out of wedging engagement with the race 20 of adjusting and locking ring 11, thereby enabling the operator to manipulate the adjusted member (or steering wheel part) 12 in the desired degree. Upon completion of the adjustment, the operator releases the handpiece 43, whereupon all sprags are urged by coiled garter spring 22 into wedging and locking engagement between the fixed element 14 and the race surface 20.

A retainer ring 45 applied to the fixed member 14 serves to retain the sprags 18 axially.

Since the moment arm "$a$" of the operating handpiece 43 to the fulcrum point F at tooth 38 greatly exceeds the moment arm from that fulcrum to the operating pin 36, it is seen that a large mechanical advantage, represented by the ratio "a/b," is had; and the breaking loose or freeing of the sprags 18 for the adjusting motion is greatly facilitated. The resistance to motion is quite likely to become considerable, and overcome only with noticeable inconvenience, unless a mechanical advantage is provided as described.

It is to be noted by reference to FIG. 2 of the drawings that the tilting fingers 26 of the stamping 28 have engagement with the sprags 18 only at the radially outermost portions of the later, the function of the fingers being only for the loosening or freeing of the sprags, and not a drive function in the usual clutch sense. This is also true of the modified, mechanical advantage-multiplying embodiment of FIGS. 4, 5 and 6, which is herein shown as also incorporated in a simple adjusting mechanism. However, it is to be understood (as will appear from the description of the driving clutch embodiment of FIGS. 7 and 8) that the compounded or multiplying mechanical advantage features of the form of FIGS. 4, 5 and 6 may also be incorporated in a driver application, upon making provision for the initial tilting of the sprags and subsequent driving through the latter, in the manner of the Lund applications identified above.

For the sake of simplicity, parts of the mechanical advantage compounding embodiment, designated 48 in FIGS. 4, 5 and 6, which correspond to those of FIGS. 1, 2 and 3, are designated by corresponding reference numerals, primed, and further description thereof will be dispensed with. In this instance, it is intended that the mechanism 48 be operated under the control of a small diameter knob (not shown) or input member connected, for example, by a shaft 49 having a splined coupling, at 50 with an axially extending flange or sleeve portion 51 of a first operating arm member 52. This member is provided with an annular, radially extending flange 52 provided with an edge notch 54 opening radially outwardly thereof. A split ring 55 carried by the annular race member 11' serves to axially retain the operating member 52. As shown in FIGS. 4 and 5, an offset lug 57 is struck axially outwardly from a circular moment arm disc 58 of annular shape in a punched out zone 59 of that disc axially aligned with notch 54, the lug 57 being received in the latter to torque-actuate moment arm disc 58.

It is to be noted by reference to FIG. 5 that the reduced diameter body portion 30' of the member 14' is specially shaped in the radial plane of the disc 58, in that its sides and top are cut away at 60, leaving lower fulcrum points 61 at the bottoms of the cut-away zone, with a radial space intervening between the upper portion of body 30' and the central circular aperture 62 of disc 58, for a purpose to be described.

Diametrically opposite its offset lug 57, the moment arm disc 58 is provided with a radially inwardly extending edge notch 64; and this notch drivingly receives an axially outwardly offset lug or finger 65 of a second moment arm disc 66, also of annular circular outline; and the disc 66 carries the involute or cycloidal shaped fulcrum tooth 38' which engages in the keyway-shaped recess 39' in the body 30' of the fixed, socketed tubular locking member 14'. Disc 66 also carries the pin 36' which fixedly engages a unitary, finger-bearing ring, here specially designated by the reference numeral 68, on which the circumferentially spaced sprag tilting fingers 69 are formed. As previously, the tilting finger ring 68 is journaled upon the reduced size body 30' of fixed member 14'.

In the operation of the mechanism 48 of FIGS. 4, 5 and 6, assuming that adjusting torque is applied manually to the shaft 49, as by means of a small-diameter hand knob, the first, radially flanged, sleeve-like operating member 52 engages at its notch 54 the offset lug 57 of the first moment arm or lever arm disc 58. This will cause the latter to swing to one side or the other, approaching its central aperture 62 toward the relieved zone 60 of body 30', as indicated in solid and dotted line in FIG. 5.

The first lever arm disc 58 thus takes fulcruming engagement against one or the other of the shoulders 61 on reduced diameter body 30'; and continuing shift of disc 58 through the agency of member 52, i.e., by force applied to the lug 57 of disc 58, causes the latter to fulcrum about one of the shoulders 61. This causes the notch 64 of disc 58, in engaging the lug 65 of second lever arm disc 66, to shift the latter, under a mechanical advantage, in the same direction. The relation in length of the respective moment arms "a" and "b" on opposite sides of the fulcrum point at 61 is indicated in FIG. 5, thus resulting in a primary mechanical advantage of substantial value "a/b."

As the second moment or lever arm disc 66 shifts rotatively in the manner described, it swings the tilting finger ring 68 about a fulcrum F' at the point of engagement of the tooth 38' of disc 66 in the body recess 39'. This correspondingly swings the disc 36' under a force having a mechanical advantage represented by the ratio of the length of the moment or lever arm "c" (FIG. 6) between the operating lug 65 and the fulcrum point F' to the much smaller length of the arm "d" between fulcrum point F' and the operating pin 36'.

Thus, the overall mechanical force advantage of the mechanism 48 is represented by the product of its component primary and secondary mechanical advantage, or $a/b \times c/d$. It is thus seen that an extremely high force multiplying ratio can be had, enabling the mechanism 48 to be operated (for the purposes described in connection with the first embodiment) under slight finger force applied to the shaft 49, and not requiring the lever arm extension represented by the handpiece or lever 43 of the first embodiment. The elimination of the latter also makes the structure of FIGS. 4, 5 and 6 adaptable readily, with extremely slight mechanical change, to a bi-directional, anti-feedback torque transmitting clutch, such as is shown in the embodiment of FIGS. 7 and 8.

In the modification of FIGS. 7 and 8, it has been elected to illustrate sprags, designated 18'', which differ from the sprags 18 and 18' in that they are provided with rounded bearing surfaces 72. Otherwise, the clutch mechanism of FIGS. 7 and 8, generally designated 74, differs only in that its finger bearing ring, specially designated 75, not only carries axially projecting tilting fingers 76 which substantially overlap the outer radial portions of the sprags, in the zone of their bearing surfaces 72, but also substantially overlap both axially and radially the inner radial portions 77 of the sprags, as socketed in the rounded seats 78 of a power input member 79. The arrangement is similar to that shown and described in the above entitled Lund patents.

It differs from the embodiment of FIGS. 4, 5 and 6, in that the power member 79 is a rotatable one, provided with an external space 81 receiving a fulcruming tooth 82 of a secondary lever arm disc 83, which disc carries a pin 84 drivingly engaging the tilting finger ring 75, the parts 82, 83 and 84 finding their equivalents in the tooth 38', disc 66 and pin 36' of the modification of FIGS. 4, 5 and 6. Disc 83 is driven with the aid of a first mechanical advantage from a primary lever arm disc 85, corresponding to the disc 58 of the last named embodiment.

Suitable arrangements are made to connect the power member 79 to an output member; and in operation, upon drive of primary disc 85 in one direction or the other, its mechanical advantage force "a/b" (FIG. 5) drives the secondary disc 83 through its mechanical advantage force "c/d"; and the tilting finger ring 75 is correspondingly actuated.

Its action is first to engage the rounded bearing surface 72 of an adjacent sprag, thus tilting the latter from wedging engagement with the race surface 20' and, upon a further slight movement, to engage the rounded socketed portion 77 of the sprag closely adjacent its socket in the seat 78. This causes the rotatable power member 79 to be driven positively through the fingers 75, the sprags 18″ and the socket seats 78 of member 79. The latter is splined at 80 or otherwise formed to drive an output member (not shown), and an end ring 81 retains the sprags axially, and provides concentricity.

Thus, it is seen that the invention affords various embodiments useful in either a simple adjusting mechanism of the sprag type, i.e., for facilitating freeing or loosening of the sprag wedge surfaces from a holding or locking race and thus permitting an adjustment of a member relative to another, upon termination of which adjustment the first named member is re-locked; or for a bi-directional drive clutch, in which such sprag freeing is followed by bidirectional power transmission originating at the member which occasioned the initial sprag tilt. In either type installation, simple and inexpensive but effective provision is made for multiplying the input tilting and unloosening force in practically any degree that may be desired.

What I claim as my invention is:

1. A mechanism of the type described, comprising a pair of relatively rotatable, radially spaced and coaxially telescoped race members, one of which is provided with a cylindrical race surface and the other of which is provided with a circumferential series of sprag sockets, a series of circumferentially spaced sprags tiltably mounted in said sockets, said sprags acting between said sockets and said race surface to releasably wedge in engagement against the latter and lock said race members together, and force multiplying means to release the sprags from said wedging engagement by tilting the sprags in said sockets, comprising an operated unit guided for rotation relative to both of said race members, said unit being provided with fingers engageable with the respective sprags to tilt the latter in said sockets and thus release the sprags, said force multiplying means further comprising an operating member having a first outer driving means connecting the same to said operated unit, a second outer means for the application of force to the operating member, and a fulcruming means connecting the same to one of said race members intermediate said respective outer means, the lever arm distance from said last named fulcruming means to said second outer means substantially exceeding that from said fulcruming means to said first outer means, thereby establishing a substantial mechanical advantage in the application of tilting force to said fingers, said fulcruming connection comprising a tooth on one of said operating and last named race members and a recess on the other of said operating and last named race members in which the tooth is received for fulcruming action, said operating member and other race member having means enabling a relative bodily floating movement thereof in said fulcruming action.

2. A mechanism of the type described, comprising a pair of relatively rotatable, radially spaced and coaxially telescoped race members, one of which is rotatable and provided with a cylindrical race surface and the other of which is fixed and provided with a circumferential series of sprag sockets, a series of circumferentially spaced sprags tiltably mounted in said sockets, said sprags acting between said sockets and said race surface to releasably wedge in engagement against the latter and lock said race members together, and force multiplying means to release the sprags from said wedging engagement by tilting the sprags in said sockets, comprising an operated unit guided for rotation relative to both of said race members, said unit being provided with fingers engageable with the respective sprags to tilt the latter in said sockets and thus release the sprags, said force multiplying means further comprising an operating member having a first outer driving means connecting the same to said operated unit, a second outer means for the application of force to the operating member, and a fulcruming means connecting the same to one of said race members intermediate said respective outer means, the lever arm distance from said last named fulcruming means to said second outer means substantially exceeding that from said fulcruming means to said first outer means, thereby establishing a substantial mechanical advantage in the application of tilting force to said fingers, said fulcruming connection comprising a tooth on one of said operating and last named race members and a recess on the other of said operating and last named race members in which the tooth is received for fulcruming action, said operating member and other race member having means enabling a relative bodily floating movement thereof in said fulcruming action.

3. A mechanism of the type described, comprising a pair of relatively rotatable, radially spaced and coaxially telescoped race members, one of which is fixed and provided with a cylindrical race surface and the other of which is provided with a circumferential series of sprag sockets, a series of circumferentially spaced sprags tiltably mounted in said sockets, said sprags acting between said sockets and said race surface to releasably wedge in engagement against the latter and lock said race members together, and force multiplying means to release the sprags from said wedging engagement by tilting the sprags in said sockets, comprising an operated unit guided for rotation relative to both of said race members, said unit being provided with fingers engageable with the respective sprags to tilt the latter in said sockets and thus release the sprags, said fingers thereafter engaging said sprags adjacent said sockets to drive the socketed race member, said force multiplying means further comprising an operating member having a first outer driving means connecting the same to said operated unit, a second outer means for the application of force to the operating member, and a fulcruming means connecting the same to said socketed race member at a point which is intermediate said respective outer means, the lever arm distance from said last named fulcruming means to said second outer means substantially exceeding that from said fulcruming means to said first outer means, thereby establishing a substantial mechanical advantage in the application of tilting and driving force to said fingers, said fulcruming connection comprising a tooth on one of said operating and last named race members and a recess on the other of said operating and last named race members in which the tooth is received for fulcruming action, said operating member and other race member having means enabling a relative bodily floating movement thereof in said fulcruming action.

4. A mechanism in accordance with claim 1, and further comprising a device operatively connected to said operating member to transmit force thereto under a second mechanical advantage.

5. A mechanism in accordance with claim 2, and further comprising a device operatively connected to said operating member to transmit force thereto under a second mechanical advantage.

6. A mechanism in accordance with claim 3, and further comprising a device operatively connected to said operating member to transmit force thereto under a second mechanical advantage.

References Cited by the Examiner

UNITED STATES PATENTS

| 2,559,960 | 7/51 | Houplain | 192—8 |
|---|---|---|---|
| 3,102,618 | 9/63 | Lund | 192—8 |

FOREIGN PATENTS

| 863,455 | 1/41 | France. |
|---|---|---|

DAVID J. WILLIAMOWSKY, *Primary Examiner.*